United States Patent
Jing

(10) Patent No.: US 9,448,108 B2
(45) Date of Patent: Sep. 20, 2016

(54) MEASURING AND ADJUSTING SYSTEM AND METHOD ON UNIFORMITY OF LIGHT INTENSITY OF LIGHT SOURCE

(71) Applicants: HEFEI BOE OPTOELECTRONICS TECHNOLOGY CO., LTD., Hefei (CN); BOE TECHNOLOGY GROUP CO., LTD., Beijing (CN)

(72) Inventor: Yangkun Jing, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 365 days.

(21) Appl. No.: 14/236,264

(22) PCT Filed: Jun. 18, 2013

(86) PCT No.: PCT/CN2013/077405
§ 371 (c)(1),
(2) Date: Jan. 30, 2014

(87) PCT Pub. No.: WO2014/139231
PCT Pub. Date: Sep. 18, 2014

(65) Prior Publication Data
US 2015/0330833 A1    Nov. 19, 2015

(30) Foreign Application Priority Data
Mar. 14, 2013    (CN) .......................... 2013 1 0081790

(51) Int. Cl.
*G01J 1/42* (2006.01)
*G01J 1/44* (2006.01)
(Continued)

(52) U.S. Cl.
CPC .................. *G01J 1/429* (2013.01); *G01J 1/16* (2013.01); *G01J 1/32* (2013.01); *G01J 1/44* (2013.01); *G01J 1/50* (2013.01); *G01J 3/50* (2013.01); *G01J 2001/444* (2013.01)

(58) Field of Classification Search
CPC ................. G01J 1/50; G01J 1/16; G01J 1/32; G01J 1/44; G01J 1/4292; G01J 3/50; G01J 2001/444
See application file for complete search history.

(56) References Cited

U.S. PATENT DOCUMENTS

2008/0008466 A1*  1/2008  Sasaki ................. G03B 15/05
                                                      396/164
2011/0133672 A1*  6/2011  Tsang ..................... F21S 10/02
                                                      315/294
(Continued)

FOREIGN PATENT DOCUMENTS

CN    101556381 A     10/2009
JP    08-159868       6/1996
JP    2000-340478     8/2000

OTHER PUBLICATIONS

Sep. 15, 2015—International Preliminary Report on Patentability for Appn PCT/CN2013/077405.
(Continued)

*Primary Examiner* — John Lee
(74) *Attorney, Agent, or Firm* — Banner & Witcoff, Ltd.

(57) ABSTRACT

A measuring and adjusting system and method on uniformity of light intensity of a light source. The measuring and adjusting system on uniformity of light intensity of a light source includes: a light intensity measuring plate; a light source, irradiating light to the light intensity measuring plate; an image acquisition module, acquiring color difference variation image on the light intensity measuring plate; a microprocessor, connected with the image acquisition module and connected with the light source through a control module, wherein the microprocessor compares the color difference variation image with colorimetric criterion internally stored, and obtains the light intensity distribution on the whole surface of the light intensity measuring plate, so as to judge the uniformity situation, and performs adjustment on the light intensity of the light source.

20 Claims, 1 Drawing Sheet

(51) Int. Cl.

*G01J 3/50* (2006.01)
*G01J 1/16* (2006.01)
*G01J 1/32* (2006.01)
*G01J 1/50* (2006.01)

(56) References Cited

U.S. PATENT DOCUMENTS

2013/0141693 A1\* 6/2013 McCabe ............... G02C 7/104
 351/159.56
2015/0330833 A1\* 11/2015 Jing ..................... G01J 1/50
 250/205

OTHER PUBLICATIONS

Yukina et al., Remote energy storage in Ni(OH)2 with TIO2 photocatalyst, Physical Chemistry Chemical Physics, 2006, vol. 8, pp. 2716-2719.
Zhi et al., A new detection method for brightness and chrome of outdoor full color LED display screen, Laser Journal, 2010, vol. 31, No. 4, pp. 63-65.
International Search Report for International Application No. PCT/CN2013/077405, 13pgs.
First Office Action issued by the Chinese Patent Office for Chinese Patent Application No. 201310081790.6 dated Jun. 30, 2014, 5pgs.
English translation of First Office Action issued by the Chinese Patent Office for Chinese Patent Application No. 201310081790.6 dated Jun. 30, 2014, 5pgs.

\* cited by examiner

MEASURING AND ADJUSTING SYSTEM AND METHOD ON UNIFORMITY OF LIGHT INTENSITY OF LIGHT SOURCE

CROSS REFERENCE TO RELATED APPLICATIONS

This application is based on International Application No. PCT/CN2013/077405 filed on Jun. 18, 2013, which claims priority to Chinese National Application No. 201310081790.6 filed on Mar. 14, 2013, the contents of which are incorporated herein by reference.

FIELD OF THE INVENTION

Embodiments of the present invention relate to a measuring and adjusting system and method on uniformity of light intensity of a light source.

BACKGROUND

Conventional measuring and adjusting system to measure the uniformity of the light intensity of UV ray can only perform point measuring, and when performing measurement on the uniformity of the light intensity (the uniformity irradiated by the light ray) of a UV curing machine, it needs to measure a plurality of times, and then perform data processing, and finally analyze and modulate the uniformity of the light intensity. There exists a very big disadvantage, i.e., the method can not perform multi-point measurements at the same time, and the measured data is the data measured at different times, and it not only costs a lot of time, but also has a very low precision, and is not direct viewing, either.

One light intensity measuring structure in the prior art makes use of photochromism phenomena. The photochromism means that some compound would change in their molecular structure under the action of light with certain wavelength and intensity, so as to cause corresponding change of its adsorption peak value to light (i.e., color), and such change is generally reversible.

FIG. 1 illustrates a light intensity measuring structure made by photochromism material in the prior art. In the light intensity measuring structure, a first metal oxide thin film 2 and a second metal oxide thin film 3 are disposed between two substrates 1, and the two thin films are respectively plated on these two substrates and the plated surfaces of the two substrates face each other, so as to form metal oxide interlayer between these two substrates 1. When light is irradiated on the interlayer, electron is transferred between the two thin films, so that valence state of the metal oxide changes, and the color of the interlayer would change as well, and meanwhile, the interlayer would have characteristics of photochromism and electrochromism.

Thus, the embodiments of the present invention provide a new system and method for measuring and adjusting uniformity of light intensity.

SUMMARY

The embodiments of the present invention provides a measuring and adjusting system and method on uniformity of light intensity of a light source, which can quickly and precisely perform measurement and adjustment on the uniformity of the light intensity.

According to one aspect of the present invention, an embodiment of the present invention provides a measuring and adjusting system on uniformity of light intensity of a light source, comprising: a light intensity measuring plate, comprising a first substrate, a second substrate and a photochromism material between the first and second substrates; a light source, irradiating light to the light intensity measuring plate; an image acquisition module, acquiring color difference variation image of the light intensity measuring plate; a microprocessor, which is connected with the image acquisition module, receives the color difference variation image and compares the color difference variation image with a colorimetric criterion stored in the microprocessor, to obtain the light intensity distribution on the whole surface of the light intensity measuring plate, so as to judge an uniformity situation of the light intensity emitted by the light source; and a control module, wherein the microprocessor is connected with the light source through the control module and performs adjustment on the light intensity of the light source by the control module according to a judging result.

In an embodiment, a nickel hydroxide $(NiOH)_2$ thin film may be formed on one surface of the first substrate of the light intensity measuring plate, and a titanium dioxide $(TiO_2)$ thin film may be formed on one surface of the second substrate, and the surfaces of the two substrates forming the thin films are bonded to each other; and the light source may be a UV light source.

In an embodiment, the measuring and adjusting system on uniformity of light intensity of a light source may further include a detector, and the detector is connected with the microprocessor, measures information of the light intensity irradiated by the light source, and transfers the light intensity information to the microprocessor, to correct the colorimetric criterion stored in the microprocessor.

In an embodiment, a plurality of detectors are provided, which are distributed at interval above a region where the light intensity measuring plate is placed, and perform multi-point acquisition on the information of the light intensity irradiated by the light source.

In an embodiment, the detector and the microprocessor may be connected by a signal processing module, and the signal processing module performs analyzing and processing on the multi-point light intensity information acquired by the detector, and transfers the light intensity value and corresponding position information acquired by the detector to the microprocessor.

An embodiment of the present invention further provides a measuring and adjusting method of an uniformity of an intensity of a light source, and the method comprises the following steps: S1, obtaining a color difference variation image; S2, analyzing and processing the color difference variation image, to obtain light intensity information, and judge the uniformity situation of the light intensity information; S3, adjusting the light intensity of the light source.

In an embodiment, the color difference variation image may be obtained by continuously acquisition in a period of time.

In an embodiment, the step S2 may comprise: comparing the color difference variation image with a colorimetric criterion, and obtain light intensity values corresponding to respective positions and a curve of the light intensity values corresponding to respective positions changing with time lapse.

In an embodiment, the measuring and adjusting method on a uniformity of an intensity of a light source may further comprise the following steps: measuring information of the light intensity irradiated by the light source, to correct the colorimetric criterion.

In an embodiment, the step S3 may comprise: adjusting the light intensity of the light source by adjusting a supplied voltage.

In the measuring and adjusting system on uniformity of light intensity of a light source and a measuring and adjusting method thereof provided by the embodiments of the present invention, the light intensity measuring plate can measure the light intensity of the whole irradiated surface at one time, and obtain the image of the light intensity of the whole irradiated surface changing with time lapse, so as to precisely show the uniformity degree of the light intensity of the whole irradiated surface. The measuring and adjusting system and method on uniformity of light intensity of a light source according to the embodiments of the present invention may be applied to the measuring and adjusting on the uniformity of the light intensity of sealant curing, coating, etching equipments, etc., and time and manpower can be saved and the resultant data is full and precise.

DETAILED DESCRIPTION

The detailed embodiments of the present invention may be further described in detail by in connection with the figures of the embodiments. The following embodiments are used to describe the present invention, but not used to limit the scope of the present invention.

First Embodiment

Figure 3:
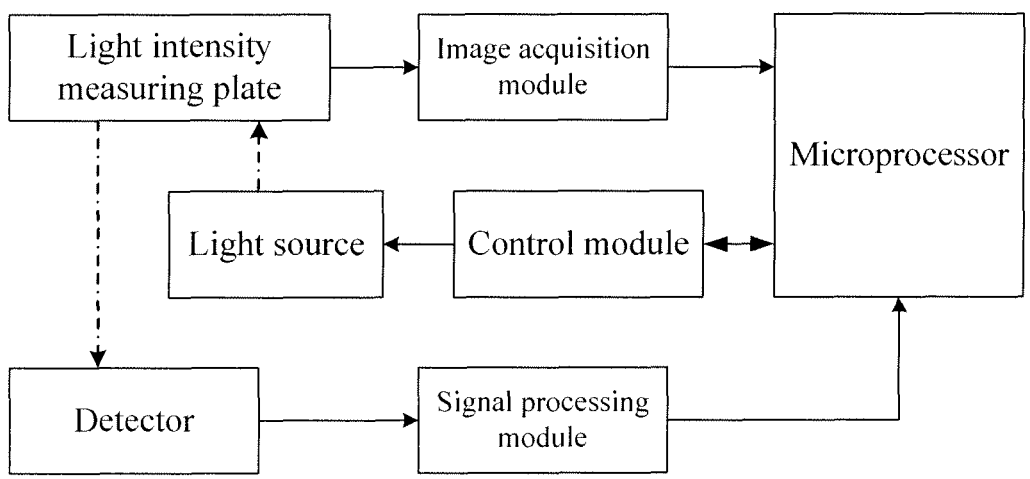
FIG. 3 is a structural schematic view of a measuring and adjusting system on uniformity of light intensity of a light source in an embodiment of the present invention.

The present embodiment provides a measuring and adjusting system on uniformity of light intensity of a light source. As illustrated in FIG. 3, the measuring and adjusting system comprises a light intensity measuring plate, a light source, an image acquisition module and a microprocessor. The light source is used to irradiate light to the light intensity measuring plate, and the image acquisition module is used to acquire color difference variation image of the light intensity measuring plate; the microprocessor is connected with the image acquisition module, receives the color difference variation image, compares the color difference variation image with colorimetric criterion stored in the microprocessor, and obtains the light intensity distribution on the whole surface of the light intensity measuring plate, so as to judge the uniformity situation of light intensity emitted by the light source. The microprocessor is further connected with the light source by a control module and performs adjustment on the light intensity of the light source by the control module.

Figure 1:
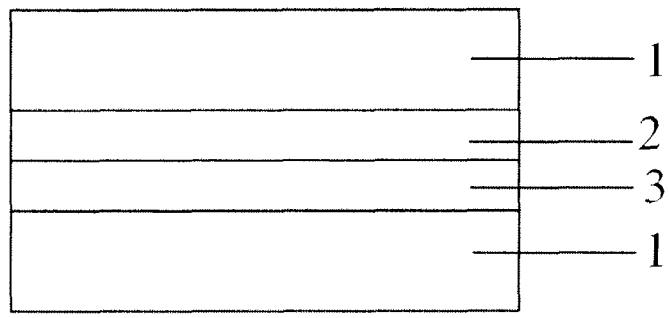
FIG. 1 is a schematic view of a light intensity measuring structure made by photochromism material in the prior art.

The following will give a detailed description by taking measuring and adjusting the uniformity of light intensity of a UV light source as an example. In the example, the light source is a UV light source, and correspondingly, the light intensity measuring plate is a UV light intensity measuring plate. The UV light intensity measuring plate may be designed on the basis of a new type of photochromism material, and this material can transit from a transparent state to an opaque state as the irradiated light intensity is increased or a small voltage is applied. The structure of the UV light intensity measuring plate adopted by the present embodiment is illustrated in FIG. 1, and a $Ni(OH)_2$ thin film and a $TiO_2$ thin film are respectively plated on the surfaces of the two substrates 1, and the surfaces of the two substrates plated with thin films are attached to each other, to form a Ti—Ni interlayer between two substrates 1. When UV light is irradiated on the Ti—Ni interlayer, electrons are transferred from the $Ni(OH)_2$ thin film to the $TiO_2$ thin film, and the $Ni(OH)_2$ is transformed to oxide of Ni in high valence state ($Ni^{3+}$ and $Ni^{4+}$), so that the interlayer becomes black from a gray color.

Figure 2:
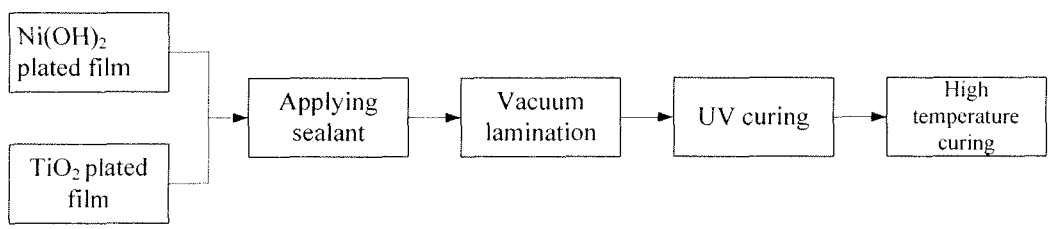
FIG. 2 is a process schematic view of manufacturing a light intensity measuring plate in an embodiment of the present invention.

The measuring and adjusting system on uniformity of light intensity of a light source in the present embodiment may be applied to measure and adjust the uniformity of the light intensity of a UV light source of a sealant curing apparatus, a coating apparatus, an etching apparatuses, etc. in the production line for liquid crystal display apparatus. Correspondingly, the UV light intensity measuring plate may be manufactured by using a TFT-LCD production line. As illustrated in FIG. 2, a process of plating film is performed in the plating machine in the array process, to perform $Ni(OH)_2$ and $TiO_2$ plating respectively on two substrates of the same generation production line; then in the cell-assembling process, sealant is coated on one plated substrate, and the two substrates are bonded in vacuum; then UV curing and thermal curing at high temperature are performed, so as to form the above described UV light intensity measuring plate.

As to different UV light sources, such as UV xenon lamp, UV metal halides lamp, UV LED, etc., under the case of being applied with the same voltage, the intensities of the light irradiated by these UV light sources at the same moment are different; as to the same kind of light sources, its irradiating light intensity would also change with the time lapse when it is turned on. Thus, the colorimetric criterion stored in the microprocessor has diversity, to meet the requirement of different UV light sources. In addition, since environment change (mainly temperature change) would influence the transferring speed of the electrons from the $Ni(OH)_2$ plated film to the $TiO_2$ plated film, so as to generate a little change on the color change of the light intensity measuring plate, it needs to correct the colorimetric criterion stored in the microprocessor at regular intervals. Thus, the measuring and adjusting system on uniformity of light intensity of UV light source in the present embodiment may further comprise: a UV detector, which is located above the region where the UV light intensity measuring plate is placed, connected with the microprocessor, measures the information of light intensity emitted by the UV light source, and transfers the light intensity information to the microprocessor to correct the colorimetric criterion stored in the microprocessor. The UV irradiating lamp may be operated with the image acquisition module at the same time, and they may also be operated at different times.

In the production line of a liquid crystal display apparatus, a UV light source, a UV detector, a control module and a microprocessor are all installed on the related equipments in the production line, and may be directly used when performing the processes of curing sealant, plating film, etching, etc. When it needs to perform measuring and adjusting on the uniformity of light intensity of UV light source after the equipment is operated for a period of time, the UV light intensity measuring plate may be moved under the UV light source and the UV detector, and the image acquisition module may be disposed above the UV light intensity measuring plate, and the image acquisition module is connected with the microprocessor. After completing measuring and adjusting on the uniformity of light intensity of UV light source, the UV light intensity measuring plate and the image acquisition module may be withdrawn.

In the present embodiment, the image acquisition module may comprise a CCD camera, preferably using a CCD camera having asynchronous shooting function, to take photo continuously on the UV light intensity measuring plate. The UV detector may be a plurality of detectors, which are distributed at intervals above the region where the UV light intensity measuring plate is placed, and perform acquisition the information of the light intensity irradiated by the UV light source at multiple points. The UV detector and the microprocessor may be connected by a signal processing module. The signal processing module may perform analytic processing on the multi-point light intensity information acquired by the UV detector, and transfer the light intensity value and corresponding position information acquired by the detector to the microprocessor.

The microprocessor mainly completes information processing, and may select a single chip or a PC machine connected with a display screen. The microprocessor performs a related image processing on the color difference image of the UV light intensity measuring plate (that is, the UV light intensity measuring plate will generate different dark and light colors due to the difference of the light intensity), compares the color difference variation image with the colorimetric criterion to obtain the light intensity information of the surface of the whole UV light intensity measuring plate. The uniform degree of the whole light intensity information distribution may be illustrated precisely. By taking photos of the color difference change image at different moments of the UV light intensity measuring plate using a CCD camera, an image of the light intensity surface changing according to time may be obtained. According to light intensity color data optical analyzing and comparing, the situation of the uniformity of light intensity of the surface is obtained, and it is easy to judge whether the uniformity of the light intensity of the UV light source is good or not, and it may further adjust supplied voltage of the UV light source by a control module, to achieve a good uniformity of the light intensity of a UV light source, and meet the requirements of the production line and related equipments. When it needs to correct the colorimetric criterion stored in the microprocessor, the UV light source and the UV detector may be turned on at the same time, and the information about light intensity irradiated by the UV light source at multi points is obtained by the UV detector, by means of the color difference variation image of the UV light intensity measuring plate stored in the microprocessor, and the difference between the light intensity value obtained by comparison the colorimetric criterion and the light intensity value measured by the UV detector about the same position on the UV light intensity measuring plate is obtained, so as to perform correction on the colorimetric criterion.

Second Embodiment

The present embodiment provides a measuring and adjusting method on uniformity of light intensity of a light source, and the method comprises the following steps:

S1, obtaining a color difference variation image;

S2, analyzing and processing the color difference variation image, obtaining light intensity information, and judging the uniformity situation of the light intensity information; and S3, adjusting the light intensity of the light source according to the result of the judging.

The color difference variation image may be obtained by continuously acquisition in a period of time. The above step S2 may comprise in detail: comparing the color difference variation image with a colorimetric criterion, to obtain light intensity values corresponding to respective positions and a curve of the light intensity values corresponding to respective positions changing with time lapse. The above step S3 may comprise: adjusting the light intensity of the light source by adjusting a supplied voltage.

The above method may further comprise the following steps: measuring information of the light intensity irradiated by the light source, to correct the colorimetric criterion.

The above measuring and adjusting method on uniformity of light intensity of a light source may be achieved by the measuring and adjusting system on uniformity of light intensity of a light source provided by the first embodiment, and the detailed operating procedure is as follows:

turning on the light source to irradiate the light intensity measuring plate, and obtaining the color difference variation image of the light intensity measuring plate;

transferring the color difference variation image to the microprocessor to perform analytic processing, to obtain the irradiated light intensity information of respective positions on the light intensity measuring plate, and judging the uniformity situation of the light intensity information; and adjusting the light intensity of the light source through a control module by the microprocessor according to the judging result.

The following will give a description on measuring and adjusting the uniformity of a UV light source as an example. When the light source changes, the corresponding light intensity measuring plate, detector and colorimetric criterion etc. may be selected. The method may comprise the following steps:

First, turning on the UV light source to irradiate the UV light intensity measuring plate, and obtaining the color difference variation image of the UV light intensity measuring plate.

In detail, the color difference variation image may be obtained by continuously acquisition in a period of time through an image acquisition module (such as a CCD camera) disposed above the UV light intensity measuring plate.

If it is to measure and adjust uniformity of light intensity of a UV light source in the processes of sealant curing, coating, etching, etc., in the production line of a liquid crystal display apparatus, before performing the above step, it needs to move the UV light intensity measuring plate to a proper position in the production line, and then turn on the UV light source.

Subsequently, transferring the color difference variation image to the microprocessor to perform analytic processing, to obtain the irradiated light intensity information of respective positions on the UV light intensity measuring plate, and judging whether the uniformity situation of the light intensity information meets a preset criterion or not.

In detail, the microprocessor may compare the color difference variation image of the UV light intensity measuring plate with the colorimetric criterion stored inside it, obtain light intensity values of various positions on the whole surface of the UV light intensity measuring plate, and obtain a curve of the light intensity values corresponding to various positions of the UV light intensity measuring plate changing according to time by combining a plurality of frames of the images being continuously taken. Further, the microprocessor compares with the preset criterion by combining the above curve of the light intensity changing according to time, to judge whether the uniformity of light intensity of the UV light source is good or not.

Then, according to the judging result, adjusting the light intensity of the UV light source through a control module by the microprocessor.

In detail, the microprocessor may adjust the light intensity of the UV light source by adjusting a supplied voltage of the UV light source by the control module.

In the present embodiment, the most critical portion is that the microprocessor performs analytic processing on the whole color difference variation image of the UV light intensity measuring plate and the light intensity information at multiple points on it, to obtain the judgment whether the uniformity of light intensity of the UV light source is good or not.

The image acquisition and processing may adopt machine visual technology. The machine visual inspection system is based on an industry camera with high resolution and visual software, and may perform appearance inspection, dimension measuring, angle measuring, character recognition, and etc. Many software enterprises at home and abroad have developed many color difference detecting type software according to market requirement, the color difference detecting system may automatically perform detecting according to user's requirement and a set technology target, and perform recognition on portion having color difference, or automatically sort and remove according to requirement, so as to provide an optimal solution for industry inspection, and improve the automation degree of the system.

As to the color difference detecting system based on machine visual technology, since it does not detect and measure by contacting, it may detect spot, depression, scratch, color difference, defection and so on, has a higher accuracy and a wider scope of spectral responsivity, and it may stably operate for a long time, save much manpower resource, and greatly improve the working efficiency.

The machine visual color difference inspection is to judge whether the color difference goes beyond the requirement or not based on the comparison and matching of a color difference library, and the color difference inspection needs to establish a color difference library of the inspected article, and make a judgment whether it is qualified or not instead of human eye by quickly comparing the real object with the color difference library. The color difference inspection needs an optical visual field as large as possible, to be able to achieve a criterion for distinguishing the minimum color difference required as a limiting resolution (since the limiting resolution of human eye is 0.1 mm, the color difference inspection generally needs to select the color difference greater than 0.1 mm, even color difference character of several millimeters). In actual application, the color difference inspection needs an optical visual field as large as possible, that is an optical power as small as possible and a depth of field as large as possible to improve efficiency, which is just contrary with the requirement of dimension measuring.

In particular, in the present embodiment, after the color difference variation image acquired by the image acquisition module is transferred to the microprocessor, it needs to perform related image preprocessing and image processing. The aim of the image preprocessing is to reduce the noise in the image, since the original image taken by the camera would have noise interference. The noise is easy to degrade quality of the image, obscure the image, submerge the image character, and bring difficulty to image analysis. The main reason of the generation of the image noise is derived from disturbance of the environment during the acquisition and transferring of the image and human factors. Optimally, it may adopt an algorithm of image processing based on high efficient median filtering to reduce the noise in the image.

The image processing procedure may comprise image segmentation, the image segmentation refers to a technology and a procedure that divides the image into regions each having features and extracts the interesting targets. The commonly used image segmentation algorithms are divided into threshold segmentation, edge segmentation and region segmentation and so on. In the present embodiment, it may optimally adopt the threshold segmentation method. To ensure the precision and processing speed of measuring and adjusting uniformity of light intensity of UV light source, the related respective modules are required to have a quick speed and a timely control. When taking photo of the UV light intensity measuring plate, it may use a CCD camera having non-synchronus shooting function, and take photos of the UV light intensity measuring plate continuously, and the obtained image is digitized by a image acquisition card and transferred to a digital image processing and judging portion in the microprocessor to perform reorganization judgment. When it is judged that the light intensity of some portion is low, it will send command to a control module to perform a command to adjust the voltage value of the UV light source. When the system is standby, the microprocessor may also receive the user's instruction, and complete the software parameter configuration of the system and so on, comprising setting the parameter of the image processing and judging portion in the microprocessor, that is a preset criterion value, a voltage value of the UV light source, turning on the UV detector, and so on.

In addition, in order to ensure accurate and correct performing of the measuring and adjusting method of the uniformity of light intensity of UV light source, the colorimetric criterion stored in the microprocessor needs to be corrected periodically, to avoid the phenomenon the electron mobility speed between the two plated films in the light intensity measuring plate is influenced by the environment change (mainly the change of the temperature), and thus the color change of the light intensity measuring plate generates little change. In detail, the information of light intensity irradiated by the UV light source is measured by using the UV detector periodically, to perform correction on the colorimetric criterion stored in the microprocessor. When it needs to perform correction on the colorimetric criterion in the microprocessor, the UV light source and the UV detector may be turned on at the same time, the light intensity information at multiple points irradiated by the UV light source is obtained through the UV detector, and by way of the color difference variation image of the UV light intensity measuring plate stored in the microprocessor, the difference between the light intensity value obtained by comparison between the colorimetric criterion and the light intensity value measured by the UV detector about the same position on the UV light intensity measuring plate is obtained, so as to perform correction on the colorimetric criterion.

It can be seen from the above embodiments that the embodiments of the present invention can measure the light intensity of the whole irradiated surface at a time, and obtain the image of the light intensity on the whole surface of the light intensity measuring plate changing with time lapse, so as to precisely show the uniform degree of the light intensity of the whole irradiated surface; while measuring the uniformity of the light intensity of the light source, they may also adjust its uniformity. The system and method of measuring and adjusting uniformity of light intensity of a light source according to the embodiments of the present invention may be applied to measuring and adjusting the uniformity of the light intensity of sealant curing equipment, coating equipment, etching equipment, etc, and time and manpower can be saved and the data is full and precise.

The forgoing are only preferable embodiments of the present invention. It is to be noted that, those with ordinary skills in the art may make various modifications and changes without departing the technical principle of the present invention, and these modifications and changes should be deemed to be within the protection scope of the present invention.

What is claimed is:

1. A measuring and adjusting system on uniformity of light intensity of a light source, comprising:
    a light intensity measuring plate comprising a first substrate, a second substrate and a photochromism material disposed between the first and second substrates;
    the light source, irradiating light on a surface of the light intensity measuring plate;
    an image acquisition module, acquiring a color difference variation image of the light intensity measuring plate, wherein the color difference variation image is obtained from different dark and light colors generated by the light intensity measuring plate due to a difference of the light intensity;
    a microprocessor, connected with the image acquisition module, receiving the color difference variation image and comparing the received color difference variation image with a colorimetric criterion stored in the microprocessor according to light intensity color data, to obtain a light intensity distribution on the entire surface of the light intensity measuring plate, so as to determine uniformity of the light intensity of the light source; and
    a control module,
    wherein the microprocessor is connected with the light source through the control module and performs adjustment on the light intensity of the light source by the control module according to the determined uniformity of the light intensity of the light source.

2. The measuring and adjusting system of claim 1, wherein the photochromism material comprises nickel hydroxide and titanium dioxide, and a nickel hydroxide thin film is formed on one surface of the first substrate of the light intensity measuring plate, and a titanium dioxide thin film is formed on one surface of the second substrate, the one surface of the first substrate formed with the nickel hydroxide thin film and the one surface of the second substrate formed with the titanium dioxide thin film are bonded to each other in a state of facing each other, the light source is a UV light source.

3. The measuring and adjusting system of claim 1, further comprising:
    a detector, connected with the microprocessor, measuring information of an intensity of the light irradiated by the light source, transferring the information of the intensity of the light to the microprocessor, to correct the colorimetric criterion stored in the microprocessor.

4. The measuring and adjusting system of claim 3, further comprising a plurality of detectors distributed at intervals above a region where the light intensity measuring plate is placed and acquiring the information of the intensity of the light irradiated by the light source at multiple points.

5. The measuring and adjusting system of claim 3, further comprising a signal processing module connecting the detector and the microprocessor to each other, analyzing and processing on multi-point light intensity information acquired by the detector, and transferring a light intensity value and corresponding position information acquired by the detector to the microprocessor.

6. A measuring and adjusting method on uniformity of light intensity of a light source, comprising:
    step S1, obtaining a color difference variation image from different dark and light colors generated by a light intensity measuring plate due to difference of the light intensity;
    step S2, comparing the color difference variation image with a colorimetric criterion according to light intensity color data, to obtain light intensity information, so as to determine uniformity of the light intensity information; and
    step S3, adjusting the light intensity of the light source according to the determined uniformity of the light intensity information.

7. The measuring and adjusting method of claim 6, wherein the color difference variation image is obtained continually in a period of time.

8. The measuring and adjusting method of claim 6, wherein the step S2 further comprises: obtaining light intensity values corresponding to respective positions and a curve of the light intensity values corresponding to respective positions changing with time lapse.

9. The measuring and adjusting method of claim 6, further comprising the step of:
    measuring information of an intensity of the light irradiated by the light source, to correct the colorimetric criterion.

10. The measuring and adjusting method of claim 6, wherein the step S3 comprises: adjusting the light intensity of the light source by adjusting a supplied voltage.

11. The measuring and adjusting system of claim 2, further comprising:
    a detector, connected with the microprocessor, measuring information of an intensity of the light irradiated by the light source, transferring the information of the intensity of the light to the microprocessor, to correct the colorimetric criterion stored in the microprocessor.

12. The measuring and adjusting system of claim 11, further comprising a signal processing module connecting the detector and the microprocessor to each other, analyzing and processing on multi-point light intensity information acquired by the detector, and transferring a light intensity value and corresponding position information acquired by the detector to the microprocessor.

13. The measuring and adjusting system of claim 3, further comprising a signal processing module connecting the detector and the microprocessor to each other, analyzing and processing on multi-point light intensity information acquired by the detector, and transferring a light intensity value and corresponding position information acquired by the detector to the microprocessor.

14. The measuring and adjusting system of claim 4, further comprising a signal processing module connecting the detector and the microprocessor to each other, analyzing and processing on multi-point light intensity information acquired by the detector, and transferring a light intensity value and corresponding position information acquired by the detector to the microprocessor.

15. The measuring and adjusting method of claim 7, wherein the step S2 further comprises: obtaining light intensity values corresponding to respective positions and a curve of the light intensity values corresponding to respective positions changing with time lapse.

16. The measuring and adjusting method of claim 7, further comprising the step of:

measuring information of an intensity of the light irradiated by the light source, to correct the colorimetric criterion.

17. The measuring and adjusting method of claim 8, further comprising the step of:
   measuring information of an intensity of the light irradiated by the light source, to correct the colorimetric criterion.

18. The measuring and adjusting method of claim 7, wherein the step S3 comprises: adjusting the light intensity of the light source by adjusting a supplied voltage.

19. The measuring and adjusting method of claim 8, wherein the step S3 comprises: adjusting the light intensity of the light source by adjusting a supplied voltage.

20. The measuring and adjusting method of claim 9, wherein the step S3 comprises: adjusting the light intensity of the light source by adjusting a supplied voltage.

* * * * *